(12) United States Patent
Kumagai (10) Patent No.: US 7,946,013 B2
(45) Date of Patent: May 24, 2011

(54) JIG FOR DRIVING CLOSING CAP FOR BOLT INSTALLATION HOLE

(75) Inventor: Masahiro Kumagai, Tokyo (JP)

(73) Assignees: THK Co., Ltd, Tokyo (JP); THK GmbH, Ratingen (DE)

( * ) Notice: Subject to any disclaimer, the term of this patent is extended or adjusted under 35 U.S.C. 154(b) by 20 days.

(21) Appl. No.: 12/095,367

(22) PCT Filed: Nov. 15, 2006

(86) PCT No.: PCT/JP2006/322739
§ 371 (c)(1),
(2), (4) Date: May 21, 2009

(87) PCT Pub. No.: WO2007/063706
PCT Pub. Date: Jun. 7, 2007

(65) Prior Publication Data
US 2009/0307888 A1    Dec. 17, 2009

(30) Foreign Application Priority Data
Nov. 30, 2005    (JP) .................................. 2005-345541

(51) Int. Cl.
*B23P 19/04*    (2006.01)
(52) U.S. Cl. ................. 29/255; 29/270; 29/257; 29/276
(58) Field of Classification Search .................... 29/255, 29/244, 256–259, 263, 270–271, 278
See application file for complete search history.

(56) References Cited

U.S. PATENT DOCUMENTS

| 2,441,981 | A | 5/1948 | Stelzer | |
|---|---|---|---|---|
| 5,961,024 | A | 10/1999 | Wright, Jr. | |
| 6,196,138 | B1 * | 3/2001 | Sakai et al. | 108/22 |
| 6,601,277 | B1 * | 8/2003 | Swanson | 29/256 |
| 6,978,527 | B2 * | 12/2005 | Oser | 29/252 |

(Continued)

FOREIGN PATENT DOCUMENTS

JP    1-318642 A    12/1989

(Continued)

OTHER PUBLICATIONS

International Search Report of PCT/JP2006/322739, date of mailing Feb. 6, 2007.

(Continued)

*Primary Examiner* — Lee D Wilson
(74) *Attorney, Agent, or Firm* — Westerman, Hattori, Daniels & Adrian, LLP (57) ABSTRACT

Provided is a driving jig for a closing cap which makes it possible to drive a closing cap straight into a bolt installation hole (11) formed in a track rail (1) and which allows this driving operation to be quickly repeated on a plurality of bolt installation holes (11). The jig includes a driving piston (73) and a guide holder (72) for maintaining the driving piston (73) in a predetermined attitude with respect to the track rail (1). The driving piston (72) has a pressing portion (75) coming into contact with an upper surface of the closing cap (70), and a hammering portion (74a) to be hammered by a tool. The guide holder has a cylinder (72a) in which the driving piston (73) slides, and has, at an opening at one end of the cylinder, a guide groove (77) into which an upper portion of the track rail is loosely fitted and which is orthogonal to an axial direction of the cylinder. The guide holder is provided with a receiving opening (72b) through which the closing cap protruding beyond the track rail is received into the cylinder.

3 Claims, 4 Drawing Sheets

U.S. PATENT DOCUMENTS

| | | | | |
|---|---|---|---|---|
| 6,993,816 B2 * | 2/2006 | Greenhill | ............... | 29/229 |
| 7,496,999 B2 * | 3/2009 | Robarge | ............... | 29/265 |
| 7,658,368 B2 * | 2/2010 | Laun | ............... | 254/18 |
| 7,694,400 B2 * | 4/2010 | Schlueter et al. | ............... | 29/258 |
| 7,765,664 B2 * | 8/2010 | Duarte | ............... | 29/215 |
| 2009/0307888 A1 * | 12/2009 | Kumagai | ............... | 29/283 |

FOREIGN PATENT DOCUMENTS

| | | | |
|---|---|---|---|
| JP | 05-138428 A | 6/1993 | |
| JP | 5-70871 U | 9/1993 | |
| JP | 7-108471 A | 4/1995 | |
| JP | 2001-315017 A | 11/2001 | |
| JP | 2002-048138 A | 2/2002 | |
| JP | 2004-90195 A | 3/2004 | |

OTHER PUBLICATIONS

Notification of Transmittal of Translation of the International Preliminary Report on Patentability (Form PCT/IB/338) of International Application No. PCT/JP2006/322739 mailed Jul. 17, 2008 with Form PCT/IPEA/409.

Supplementary European Search Report dated Aug. 4, 2010, issued in corresponding European Patent Application No. 06832670.1.

* cited by examiner

Fig. 6

JIG FOR DRIVING CLOSING CAP FOR BOLT INSTALLATION HOLE

TECHNICAL FIELD

The present invention relates to a jig for embedding a closing cap in a bolt installation hole provided in a track rail of a guide device for use in a linear guide portion or a curved guide portion of a machine tool, industrial robots of various types, or the like when laying the guide device on a base portion such as a bed or a column of a machine or apparatus.

BACKGROUND ART

Conventionally, as a linear guide device constituting a linear guide portion of a machine tool, industrial robots of various types, or the like, there has been known one including a linear or an arcuate track rail having a longitudinally extending ball rolling surface and a slider assembled to the track rail through the intermediation of a large number of balls. The slider is equipped with a load rolling surface opposed to the ball rolling surface of the track rail, and a circulation path for endless circulation of the large number of balls rolling between the load rolling surface and the track rail rolling surface while bearing load. By causing the balls to circulate through the endless circulation path, the slider can continuously move over the entire length of the track rail.

Usually, the track rail is fixed to a base portion such as a bed or a column of a machine tool or the like through fastening by fixation bolts. Thus, the track rail has, at predetermined longitudinal intervals, bolt installation holes through which the fixation bolts are to be passed. If the head portions of the fixation bolts protrude beyond the track rail, they constitute an obstacle when the slider moves along the track rail, so the interior of each bolt installation hole includes a small diameter portion and a large diameter portion. The small diameter portion has an inner diameter slightly larger than the nominal diameter of the bolt, and the large diameter portion has an inner diameter slightly larger than the diameter of the bolt head portion. That is, the large diameter portion constitutes an accommodating portion for the bolt head portion, preventing the bolt head portion from protruding beyond the surface of the track rail.

It should be noted, however, that such bolt installation holes allow foreign matter such as work chips or coolant liquid of the machine tool to enter the slider moving along the track rail. Within the slider, the balls are circulating, bearing load between the slider and the track rail; if foreign matter such as work chips or dust enters the slider, flaws will be generated in the rolling surface of the track rail, the load rolling surface of the slider, and the balls, or wear of those components will be promoted, resulting in premature impairment of the movement precision of the slider of the linear guide device. Further, if coolant liquid, which is used in the machine tool to cool work, is allowed to enter the slider, the lubricant oil adhering to the ball surfaces will be washed away, resulting in premature wear of the rolling surface and the balls. In order to prevent foreign matter from entering the slider, a seal member in sliding contact with the surface of the track rail is provided around the slider, removing foreign matter adhering to the surface of the track rail as the slider moves. However, when bolt installation holes are provided in the track rail, foreign matter is allowed to enter the slider through the bolt installation holes, so the effect of the seal member is diminished. Further, the seal member is held in contact with the surface of the track rail with a certain degree of fastening force, so, when the bolt installation holes exist, the forward end portion of the seal member is rubbed against the opening edges of the bolt installation holes, resulting in premature deterioration of the seal member.

In view of this, when the linear guide device is used in an environment where foreign matter is likely to adhere to the track rail, closing caps are fitted to the bolt installation holes of the track rail after the mounting of the track rail to the base portion by fixation bolts, thus closing the bolt installation holes. The closing caps are fit-engaged with the large diameter portions of the bolt installation holes while covering the head portions of the fixation bolts accommodated in the large diameter portions, with the closing caps being flush with the surface of the track rail.

JP 05-138428 A and JP 2002-48138 A disclose metal closing caps as examples of the closing caps. Those metal closing caps have an outer diameter that is the same as or slightly larger than the inner diameter of the large diameter portions of the bolt installation holes. By being forced into the bolt installation holes, those metal closing caps are firmly fixed to the openings of the bolt installation holes. More specifically, the following forcing-in method is adopted: after lightly putting the forward end of each closing cap into the bolt installation hole, a flat plate-like jig is applied to the closing cap, and the jig is repeatedly struck by using a tool like a hammer to completely embed the closing cap in the bolt installation hole.

Further, in order to enable each closing cap to be easily forced into the bolt installation hole, and to prevent deformation of the track rail by this forcing-in operation, the closing caps are formed of a metal material whose hardness is lower than that of the metal material forming the track rail. For example, closing caps of copper alloy, aluminum alloy or the like are used for a steel track rail.

Patent Document 1: JP 05-138428 A
Patent Document 2: JP 2002-48138 A

DISCLOSURE OF THE INVENTION

Problems to be Solved by the Invention

However, in the conventional method, in which each closing cap is simply driven into the bolt installation hole through the intermediation of a flat plate-like jig, the closing cap may be inclined within the bolt installation hole depending upon the way the tool such as a hammer is swung down, with the closing cap being forced-in in this inclined state. In this case, the upper surface of the closing cap cannot be perfectly matched with the upper surface of the track rail. When the closing cap is forced-in in such an inclined state, a gap is generated between the seal member on the slider side and the closing cap, with the result that the sealing property between the slider and the track rail is impaired.

Further, since there exist a plurality of bolt installation holes arranged in the longitudinal direction of the track rail, it is necessary to repeatedly perform the above-mentioned closing cap driving-in operation on a single track rail, so the driving-in operation must be conducted quickly. However, an attempt to quickly conduct this operation only makes it harder to drive the closing caps straight into the bolt installation holes.

Further, the outer diameter of the closing caps is slightly larger than the inner diameter of the bolt installation holes, and the closing caps are formed of a material of lower hardness than the track rail, so the outer peripheral portions of the closing caps are slightly scraped off at the time of forcing in, resulting in generation, if in a small amount of, chips. Thus, when the closing cap is completely driven into the track rail by using a flat plate-like jig, chips are caught between the jig and the upper surface of the track rail or between the jig and the closing cap, resulting in generation of flaws on the upper surface of the track rail and the upper surface of the closing cap. Generation of such flaws leads to deterioration in the sealing property between the slider and the track rail.

Means for Solving the Problems

The present invention has been made in view of the above-mentioned problems in the related art. It is an object of the present invention to provide a driving jig for a closing cap which makes it possible to drive a closing cap straight into a bolt installation hole formed in a track rail of a guide device without causing the closing cap to be inclined and which allows this driving operation to be quickly repeated on a plurality of bolt installation holes.

Another object of the present invention is to provide a driving jig for a closing cap which helps to prevent the upper surface of the track rail or the upper surface of the closing cap from being flawed by chips generated at the time of driving-in of the closing cap and which makes it possible to avoid deterioration in the intimate-contact property of the seal member with respect to the track rail.

According to the present invention, there is provided a jig for driving a closing cap into a bolt installation hole provided in a track rail of a guide device, the jig including: a driving piston pressing the closing cap toward the bolt installation hole of the track rail; and a guide holder for maintaining the driving piston in a predetermined attitude with respect to the track rail. The driving piston has at one axial end thereof a pressing portion coming into contact with the upper surface of the closing cap, and, at the other axial end thereof, a hammering portion to be hammered by a tool. The guide holder has a cylinder in which the driving piston slides, and has, at an opening at one end of the cylinder, a guide groove into which the upper portion of the track rail is loosely fitted and which is orthogonal to an axial direction of the cylinder. Further, at one longitudinal end of the guide groove of the guide holder, there is provided a receiving opening through which the closing cap protruding beyond the track rail is received into the cylinder.

In this technical means, the guide holder has a guide groove into which the upper portion of the track rail is loosely fitted, and this guide groove is orthogonal to the axial direction of the cylinder, so, when the guide holder is pressed against the track rail so as to fit the track rail into the guide groove, the cylinder formed in the guide holder is held perpendicularly with respect to the surface of the track rail, and the driving piston guided by this cylinder is also always held perpendicularly with respect to the surface of the track rail. As a result, by striking the hammering portion of the driving piston by a tool such as a hammer while pressing the guide holder against the track rail, the operator can apply the pressing force of the driving piston from a direction parallel to the axial direction of the bolt installation hole, thereby making it possible to prevent the closing cap from being forced into the bolt installation hole in an inclined state.

Further, at one longitudinal end of the guide groove of the guide holder, there is provided a receiving opening through which the closing cap protruding beyond the track rail is to be received in the cylinder, so, solely by causing the guide holder to slide along the track rail while pressing the guide holder against the track rail after driving the first closing cap into the bolt installation hole, it is possible to receive the closing cap temporarily fixed to the next bolt installation hole into the cylinder. It is also possible to quickly perform the next closing cap driving operation without having to raise and move the guide holder. Further, the upper surface of the closing cap driven into the track rail is flush with the upper surface of the track rail, which means the closing cap, which has been completely driven into the track rail, does not constitute an obstacle to movement of the guide holder. Thus, the above-mentioned receiving opening is formed solely at one longitudinal end of the guide groove.

BRIEF DESCRIPTION OF THE DRAWINGS

FIG. 6 is a sectional view showing the positional relationship between the closing cap and the driving piston when the closing cap is forced in.

REFERENCE NUMERALS

1 . . . track rail, 2 . . . slider, 8 . . . base portion, 11 . . . bolt installation hole, 70 . . . closing cap, 72 . . . guide holder, 72a . . . cylinder, 73 . . . driving piston, 74a . . . hammering portion, 75 . . . pressing portion

BEST MODE FOR CARRYING OUT THE INVENTION

In the following, a driving jig for a closing cap according to the present invention is described in detail with reference to the accompanying drawings.

Figure 1:
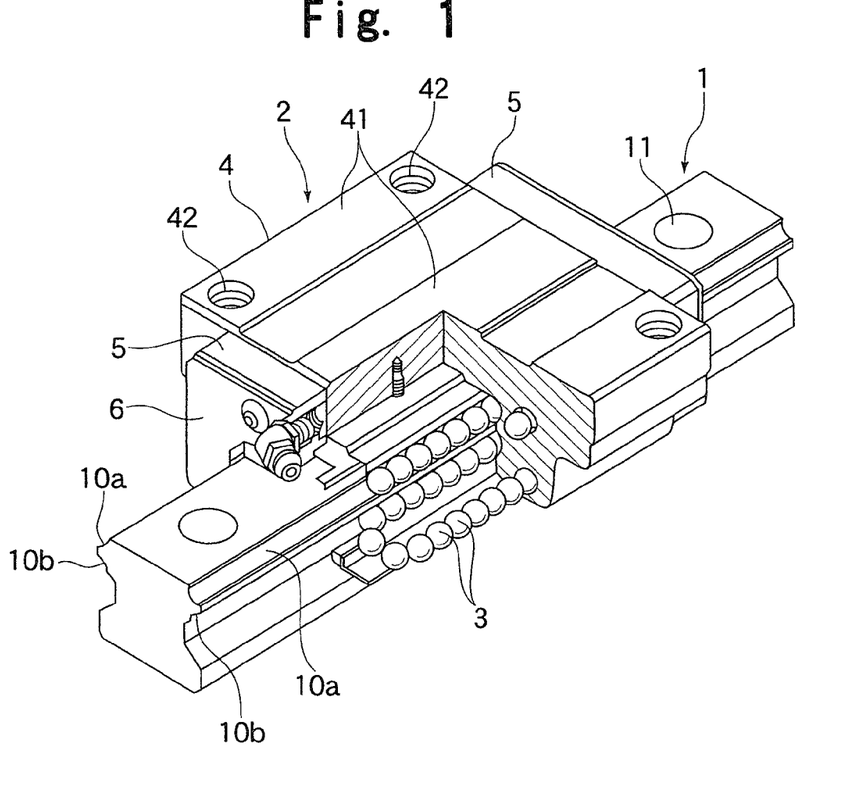
FIG. 1 is a perspective view of an example of a linear guide device to which a driving jig of the present invention is applicable.
Figure 2:
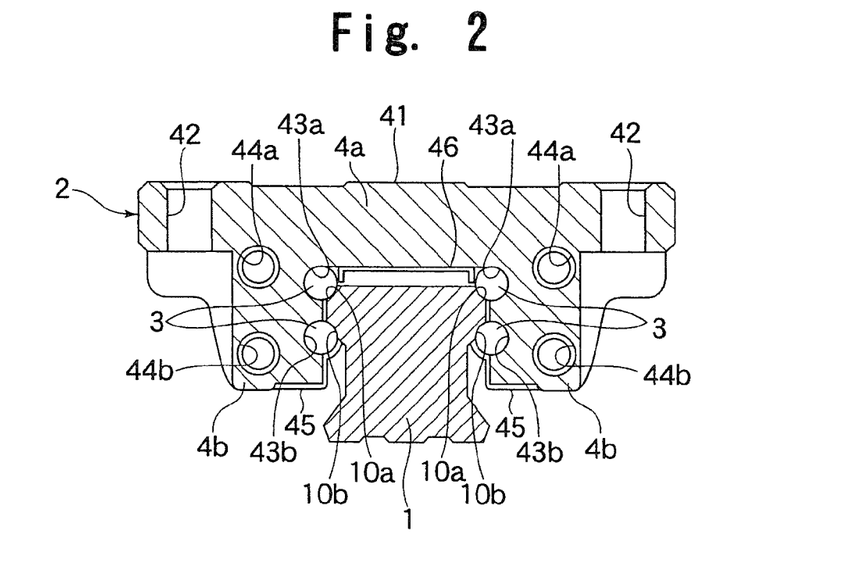
FIG. 2 is a longitudinal sectional view of the linear guide device shown in FIG. 1.

FIGS. 1 and 2 show an example of a linear guide device equipped with a track rail. This linear guide device includes a track rail 1 arranged on a base portion such as a bed, and a slider 2 freely movable along the track rail 1, with the slider 2 being freely movable on the track rail.

The track rail 1 has a substantially rectangular sectional configuration, and has four longitudinally extending ball rolling grooves 10a, 10b on which balls 3 roll. The ball rolling grooves 10a, 10b are formed on both side surfaces of the track rail 1. The ball rolling grooves 10a situated on the upper side are formed to extend from the right and left-hand sides as seen in FIG. 2 so as to be upwardly inclined by 45 degrees, whereas the ball rolling grooves 10b situated on the lower side are formed so as to be downwardly inclined by 45 degrees. The track rail 1 has bolt installation holes 11 arranged at appropriate longitudinal intervals. The track rail 1 is fixed to a base portion constituting a mounting surface by fixation bolts (not shown) inserted into the bolt installation holes 11.

The slider 2 includes a movement block 4 having a mounting surface 41 for a movable body such as a table and tap holes 42 to be threadedly engaged with fixation bolts for the movable body, and a pair of cover members 5, 5 fixed to the front and rear end surfaces of the movement block 4. By fixing the cover members 5 to the movement block 4, there are provided within the slider endless circulation paths for the balls 3. Further, seal members 6 in sliding contact with the track rail 1 are attached to the cover members 5, preventing dust or the like adhering to the track rail 1 from entering the slider 2 with the movement of the slider 2.

First, the movement block 4 is equipped with a horizontal portion 4a on which the mounting surface 41 is formed, and a pair of skirt portions 4b, 4b extending downwardly from the horizontal portion 4a, with the movement block 4 exhibiting a substantially saddle-like sectional configuration. On the lower side of the horizontal portion 4a and on the inner sides of the skirt portions 4b, there are formed four linear load rolling grooves 43a, 43b opposed to the ball rolling grooves 10a, 10b of the track rail 1. Further, the horizontal portion 4a and the skirt portions 4b have ball returning holes 44a, 44b respectively corresponding to the load rolling grooves 43a, 43b. The load rolling grooves 43a, 43b and the ball returning holes 44a, 44b corresponding thereto are connected together by U-shaped direction changing paths formed in the cover members 5, thereby forming the endless circulation paths for the balls.

As a result, the balls 3 which have been bearing load between the ball rolling grooves 10a, 10b of the track rail 1 and the load rolling grooves 43a, 43b of the movement block 4, are released from the load after rolling through the load rolling grooves 43a, 43b with the movement of the slider 2, and enter the direction changing paths of one cover member 5 to roll through the ball returning holes 44a, 44b of the movement block 4 in a non-load state in a direction reverse to the direction in which the balls 3 roll in the load rolling grooves 43a, 43b. The balls 3 having rolled through the ball returning paths 44a, 44b enter the space between the track rail 1 and the movement block 4 again via direction changing paths of the other cover member 5, and roll through the load rolling grooves 43a, 43b while bearing load.

Ball holding plates 45, 46 are respectively attached to the lower ends of the skirt portions 4b and the lower surface of the horizontal portion 4a of the movement block 4. The ball holding plates 45, 46 are formed by, for example, press working of metal plates or injection molding of hard synthetic resin, and serve to prevent the balls 3 rolling through the load rolling grooves 43a, 43b from being detached from the slider 2 when the slider 2 is removed from the track rail 1.

Figure 3:
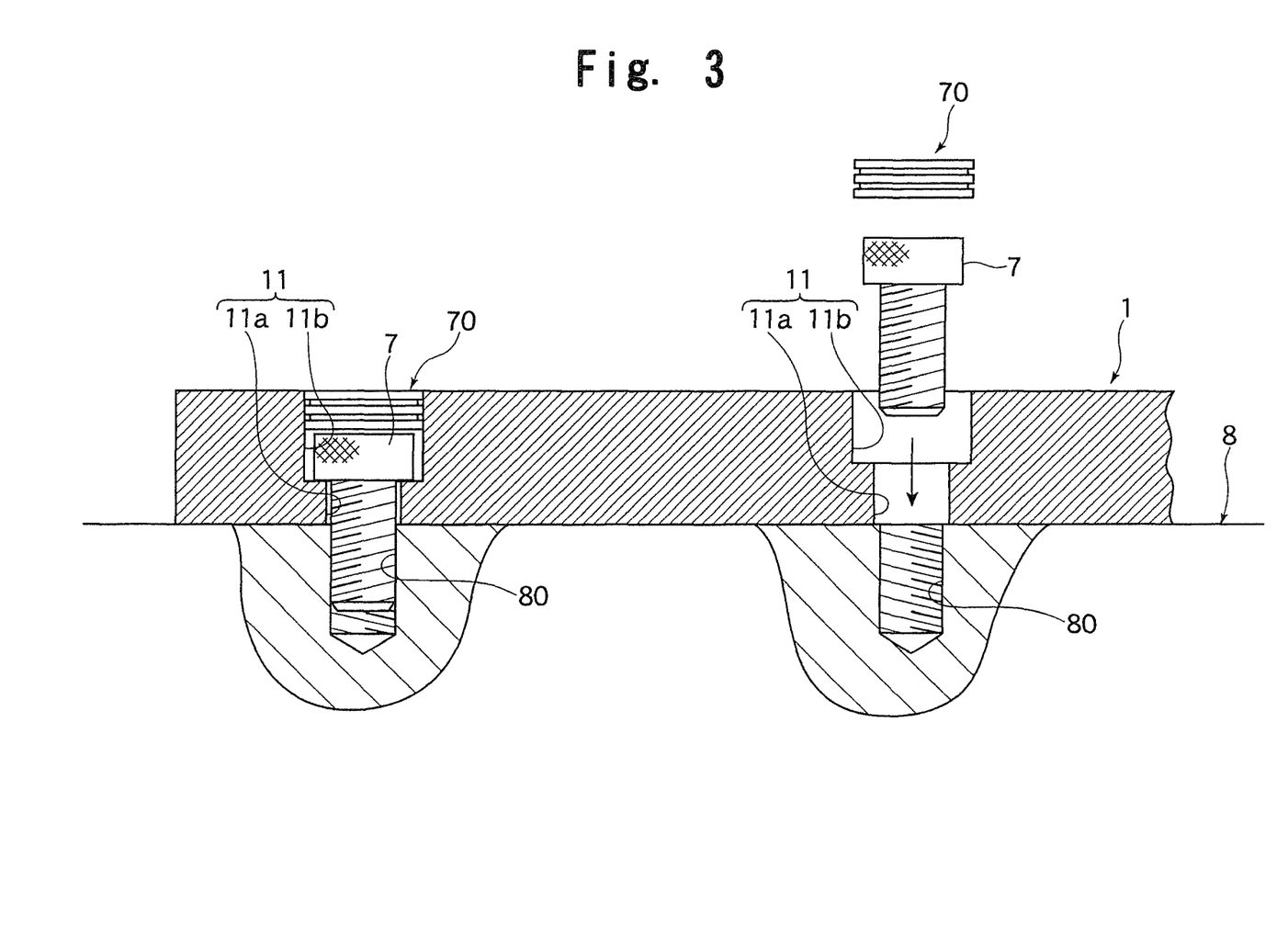
FIG. 3 is a sectional view showing a state in which fixation bolts and closing caps are attached to a track rail.

FIG. 3 is a sectional view showing a state in which the track rail 1 is fixed to a base portion 8 by using fixation bolts 7. In the drawing, the horizontal direction corresponds to the longitudinal direction of the track rail 1. As shown in the drawing, each of the bolt installation holes 11 for passing the fixation bolts 7 through the track rail 1 includes a small diameter portion 11a and a large diameter portion 11b. In the state in which the fixation bolts 7 are fastened to tap holes 80 of the base portion 8, the head portions of the fixation bolts 7 are accommodated in the large diameter portions 11b of the bolt installation holes 11. Thus, hexagon socket head cap screws are used as the fixation bolts 7.

In order to prevent dust from entering the bolt installation holes 11 during use of the linear guide device, closing caps 70 are forced into the bolt installation holes 11 after the completion of the fastening of the fixation bolts 7 and the fixation of the track rail 1 to the base portion 8, and the large diameter portions 11b of the bolt installation holes 11 are stopped above the fixation bolts 7. As a result, the intimate-contact property with respect to the track rail 1 of the seal members 6 fixed to both the front and rear ends in the moving direction of the slider 2 is enhanced, and it is possible to prevent possible intrusion of dust into the slider 2 as much as possible from the outside or leakage of lubricant from within the slider 2 to the outside. Since the track rail 1 is formed of steel, the closing caps 70 are formed of a material of lower hardness than the track rail 1 such as gunmetal or aluminum so that the track rail 1 may not be flawed or deformed when the closing caps 70 are driven in.

Figure 4:
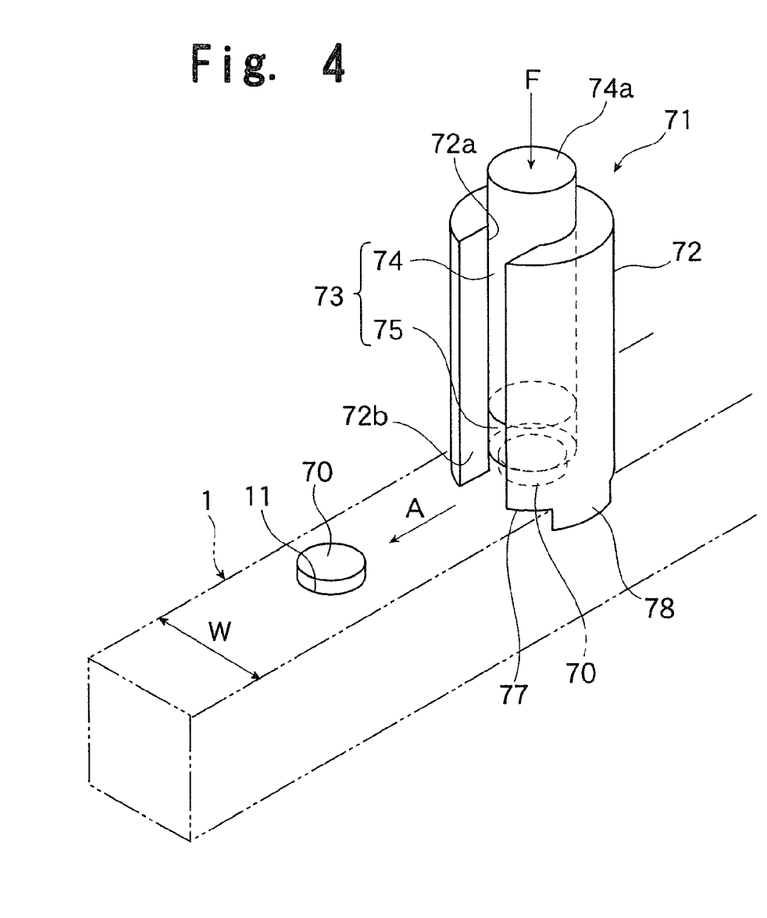
FIG. 4 is a perspective view of an example of the driving jig to which the present invention is applied.

FIG. 4 illustrates how a driving jig 71 for the closing caps 70 to which the present invention is applied is used. The driving jig 71 includes a guide holder 72 to be grasped by the operator, and a driving piston 73 held by the guide holder 72 so as to be vertically movable. By applying an external force F to the driving piston 73 by a tool such as a hammer, the driving piston 73 forces the closing caps 70 into the bolt installation holes 11 of the track rail 1.

Figure 5:
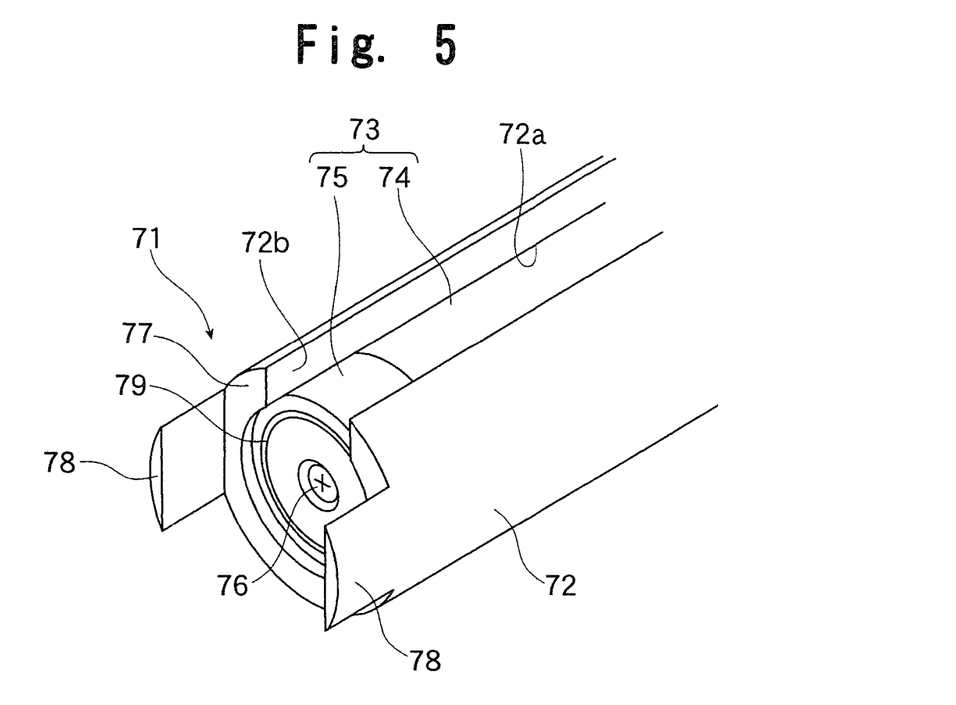
FIG. 5 is a bottom perspective view of a driving piston of the driving jig shown in FIG. 4.
Figure 6:
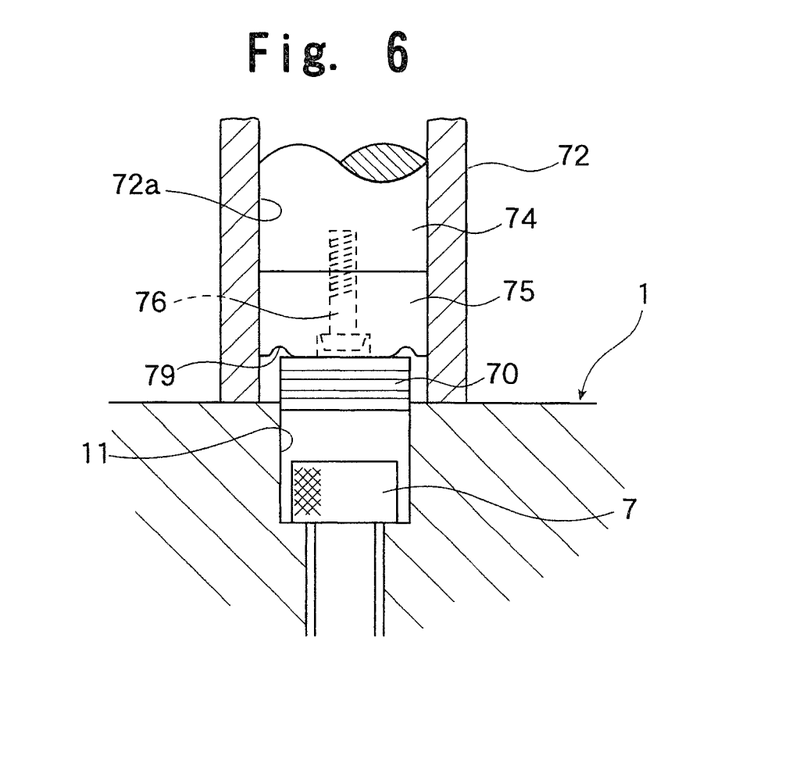

FIG. 5 is a perspective view of the driving jig 71 as seen from the forward end side of the driving piston 73, and FIG. 6 is a sectional view showing a state in which the driving piston 73 abuts the closing cap 70. The driving piston 73 is formed as a column of a diameter larger than that of the closing cap 70, and includes a piston main body 74 having a hammering portion 74a to be hammered by a tool, and a pressing portion 75 mounted to the forward end (lower end) of the piston main body 74, with the pressing portion 75 being fixed to the piston main body 74 by a bolt 76. The piston main body 74 is directly struck by a tool, so it is formed of a material of high hardness such as steel.

On the other hand, the pressing portion 75 is formed of a material of substantially the same hardness as that of the closing cap 70 so that the pressing portion 75 may not damage the upper surface of the closing cap 70 and the upper surface of the track rail 1. In this example, the pressing portion 75 is formed of the same gunmetal as that for the closing cap 70. The pressing portion 75 can be easily replaced by pulling out the bolt 76, thus allowing replacement with one formed of an optimum material according to the material of the closing cap 70 and of the track rail 1. The surface of the pressing portion 75 abutting the closing cap 70 has an annular groove 79 of substantially the same diameter as the bolt installation holes 11 of the track rail 1, that is, of substantially the same diameter as the closing cap 70. When the closing cap 70 is forced into the bolt installation hole 11 by hammering the driving piston 73, the peripheral portion of the closing cap 70 is slightly scraped off to generate metal chips. Thus, if the forward end portion of the pressing portion 75 is formed as a flat surface, the metal chips are caught between the track rail 1 and the pressing portion 75 or between the closing cap 70 and the pressing portion 75, resulting in generation of a flaw on the track rail 1 or the closing cap 70. Generation of such a flaw causes deterioration in the intimate-contact property of the seal members 6 attached to the slider 2 with respect to the track rail 1. However, as described above, the annular groove 79 of substantially the same diameter as the bolt installation hole 11 is formed in the pressing portion 75, and, as shown in FIG. 6, the contour of the closing cap 70 corresponds to the annular groove 79, so it is possible to accommodate the chips generated at the time of forcing-in of the closing cap 70 in the annular groove 79. As a result, it is possible to prevent the track rail 1 or the closing cap 70 from being flawed by the chips generated at the time of forcing-in.

Further, the guide holder 72 has a cylinder 72a in which the driving piston 73 slides and is formed in a substantially cylindrical configuration. Further, a part of the peripheral wall of the cylinder 72a is cut away in the axial direction of the driving piston 73 to form a slit 72b, the guide holder as a whole having a substantially C-shaped sectional configuration as taken in a direction orthogonal to the axial direction. The diameter of this guide holder is set larger than the rail width W of the track rail. The opening width of the slit 72b is set slightly larger than the diameter of the closing cap 70 and smaller than the diameter of the driving piston 73. The driving piston 73 does not come out through the slit 72b, and is axially slidable with respect to the guide holder 72.

At the opening of the cylinder 72a corresponding to the pressing portion 75 side of the driving piston 73, that is, at the end surface of the guide holder 72, there is formed a guide groove 77 into which the upper portion of the track rail 1 is loosely fitted. The guide groove 77 extends in the axial direction of the cylinder 72a, that is, in a direction orthogonal to the axial direction of the piston 73. When the upper portion of the track rail 1 is loosely fitted into the guide groove 77, and the guide holder 72 is pressed against the track rail 1, the driving piston 73 is held perpendicularly with respect to the upper surface of the track rail 1. The diameter of the guide holder 72 is larger than the width of the track rail 1, so, when the guide groove 77 is formed at one end of the guide holder 72, there are formed a pair of flange portions 78 with the guide groove 77 therebetween. The flange portions 78 abut the side surfaces of the track rail 1, whereby positioning is effected on the guide holder 72 with respect to the width direction of the track rail 1.

Thus, the guide holder 72 can slide in the longitudinal direction of the track rail 1 as it is, with the pair of flange portions 78 being in contact with the side surfaces of the track rail 1. The slit 72b is provided in the guide holder 72 in correspondence with one longitudinal end of the guide groove 77, when using the driving jig 71, the slit 72b is used in the direction in which the driving jig 71 slides on the track rail 1. An arrow A of FIG. 4 indicates the direction in which the guide holder slides with respect to the track rail. As a result, solely by causing the guide holder 72 to slide while pressing it against the track rail 1, the closing cap 70 temporarily fixed to the bolt installation hole 11 of the track rail 1 can be received in the cylinder 72a of the guide holder 72.

Further, the driving jig 71 thus constructed is used as follows. First, the track rail 1 is fixed to the base portion 8 by the fixation bolts 7, and then the closing caps 70 are temporarily fixed to all the bolt installation holes 11 provided in the track rail 1. In this temporary fixation, positioning is effected on the closing caps 70 with respect to the bolt installation holes 11, and the closing caps 70 are partially and lightly put into the bolt installation holes 11. Next, the guide holder 72 is placed at one end of the track rail 1, and the upper portion of the track rail 1 is fitted into the guide groove 77 of the guide holder 72. At this time, the slit 72b of the guide holder 72 is directed toward the other end of the track rail 1. After that, the guide holder 72 is caused to slide on the upper surface of the track rail 1, and moved to the position where the first bolt installation hole 11 is provided. The closing cap 70 has already been temporarily fixed to the bolt installation hole 11, and the closing cap 70 protrudes beyond the track rail 1. However, since the slit 72b is formed in the guide holder 72, the closing cap 70 is received in the cylinder 72a of the guide holder 72, making it possible to position the guide holder 72 directly above the bolt installation hole 11.

When positioning is thus effected on the guide holder 72 with respect to the bolt installation hole 11, the driving piston 73 is inserted into the cylinder 72a of the guide holder 72, and the pressing portion 75 thereof is placed on the closing cap 70. FIG. 6 shows this state. After that, the hammering portion 74a of the driving piston 73 is struck by using a tool such as a hammer while pressing the guide holder 72 against the upper surface of the track rail 1, whereby the closing cap 70 is forced into the bolt installation hole 11 of the track rail 1. When the guide holder 72 is pressed against the upper surface of the track rail 1, the driving piston 73 in the cylinder 72a is held perpendicularly with respect to the upper surface of the track rail 1, so the closing cap 70 is forced in straight in the axial direction of the bolt installation hole 11 by the driving piston 73, and the closing cap 70 is forced into the bolt installation hole 11 without being inclined.

Further, the pressing portion 75 of the driving piston 73 has a larger diameter than the closing cap 70, so when the driving piston 73 is hammered until the pressing portion 75 comes into contact with the track rail 1, the closing cap 70 is completely forced into the bolt installation hole 11, with the upper surface of the closing cap 70 being flush with the upper surface of the track rail 1, whereby the forcing of the closing cap 70 into the first bolt installation hole 11 is completed.

When the forcing of the closing cap 70 into the first bolt installation hole 11 is completed, the driving piston 73 is pulled out of the guide holder 72, and the guide holder 72 is caused to slide toward the second, adjacent bolt installation hole 11. Alternatively, it is also possible, instead of completely pulling the driving piston 73 out of the guide holder 72, to cause the guide holder 72 to slide, with the driving piston being kept raised within the guide holder 72. At this time, the first closing cap 70, on which forcing-in operation has been completed, is completely embedded in the bolt installation hole 11, so the closing cap 70 does not constitute an obstacle in causing the guide holder 72 to slide on the track rail 1. The closing cap 70 is temporarily fixed also to the second bolt installation hole 11. However, since the guide holder 72 has the slit 72b, the closing cap 70 is received in the cylinder 72a of the guide holder 72 as in the case of the first bolt installation hole 11, it is possible to position the guide holder 72 directly above the second bolt installation hole 11. After that, the operation of driving-in the closing cap 70 is conducted in the same manner as in the case of the first bolt installation hole 11. When this operation is completed, the guide holder 72 is moved to the next bolt installation hole 11. By repeating this, the closing caps 70 are forced into all the bolt installation holes 11 existing in the track rail 1.

In this way, the operation of driving the closing caps 70 into the bolt installation holes 11 of the track rail 1 is conducted by using the driving jig 71 of the present invention, whereby it is possible to conduct the forcing-in operation on the closing caps 70 while holding the driving piston 73 perpendicularly with respect to the upper surface of the track rail 1 in which the bolt installation holes 11 are provided. It is also possible to prevent the closing caps 70 from being forced into the bolt installation holes 11 in an inclined state. As a result, the intimate-contact property of the seal members 6 attached to the slider 2 with respect to the track rail 1 is improved, and it is possible to prevent foreign matter from entering the slider 2 as much as possible.

Further, it is possible to successively conduct the operation of forcing-in the closing caps 70 on a plurality of bolt installation holes 11 while causing the guide holder 72 to slide along the upper surface of the track rail 1, thereby enhancing the efficiency of this operation.

The invention claimed is:

1. A closing cap driving jig for driving a closing cap into a bolt installation hole provided in a track rail of a guide device, comprising:
    a driving piston; and
    a guide holder having
        a surface to be brought into contact with the track rail, and
        a cylinder which holds the driving piston perpendicularly with respect to the track rail under a state in which the surface is brought into contact with the track rail,
    wherein the guide holder has a receiving opening which is formed by cutting away a part of a peripheral wall of the cylinder in an axial direction along an entire axial length in said axial direction of the driving piston, such that the guide holder as a whole has a C-shape in cross-section, and wherein the guide holder is capable of receiving the closing cap with respect to the cylinder.

2. The closing cap driving jig according to claim 1, wherein, at one end of the guide holder, a pair of flange portions capable of guiding the guide holder along side surfaces of the track rail are formed.

3. The closing cap driving jig according to claim 1, wherein the driving piston comprises:
- a piston main body having a hammering portion to be hammered by a tool; and
- a pressing portion mounted to a forward end of the piston main body.

* * * * *